United States Patent [19]

Temple et al.

[11] Patent Number: 4,655,047
[45] Date of Patent: Apr. 7, 1987

[54] PROCESS FOR FREEZING OR CHILLING

[75] Inventors: George A. Temple, Toronto; Donald W. Kirkwood, Oakville; Bosko Milankov, Mississauga, all of Canada

[73] Assignee: I.Q.F. Inc., Mississauga, Canada

[21] Appl. No.: 715,893

[22] Filed: Mar. 25, 1985

[51] Int. Cl.$^4$ .............................................. F25D 17/02
[52] U.S. Cl. .......................................... 62/64; 62/74; 426/524
[58] Field of Search ................ 62/64, 74, 373, 376, 62/514 R; 426/524

[56] References Cited

U.S. PATENT DOCUMENTS

| | | | |
|---|---|---|---|
| 2,448,802 | 9/1948 | Holzcker | 62/68 |
| 2,875,588 | 3/1959 | Berger | 62/64 |
| 3,228,838 | 1/1966 | Rinfret et al. | 62/64 |
| 3,832,764 | 9/1974 | Rasovich | 62/374 |
| 3,857,974 | 12/1974 | Aref et al. | 62/64 |
| 4,077,227 | 3/1978 | Larson | 62/74 |

FOREIGN PATENT DOCUMENTS 964921  3/1975  Canada.

Primary Examiner—Ronald C. Capossela
Attorney, Agent, or Firm—Donald E. Hewson

[57] ABSTRACT

Chilling or freezing a substance into small pellets is disclosed. A substance such as liquid egg falls gently from only a small height onto the surface (12) of liquid nitrogen. The discharge nozzle (13) is prevented from freezing up by a flow of ambient or heated air over it. The surface of the boiling nitrogen is kept smooth by imparting a velocity to the nitrogen with an impeller (20) or by running the nitrogen along a trough. The pellets are consistent as to final temperature, and the process is efficient as to nitrogen use. The process can be used with other thick, creamy substances.

32 Claims, 2 Drawing Figures

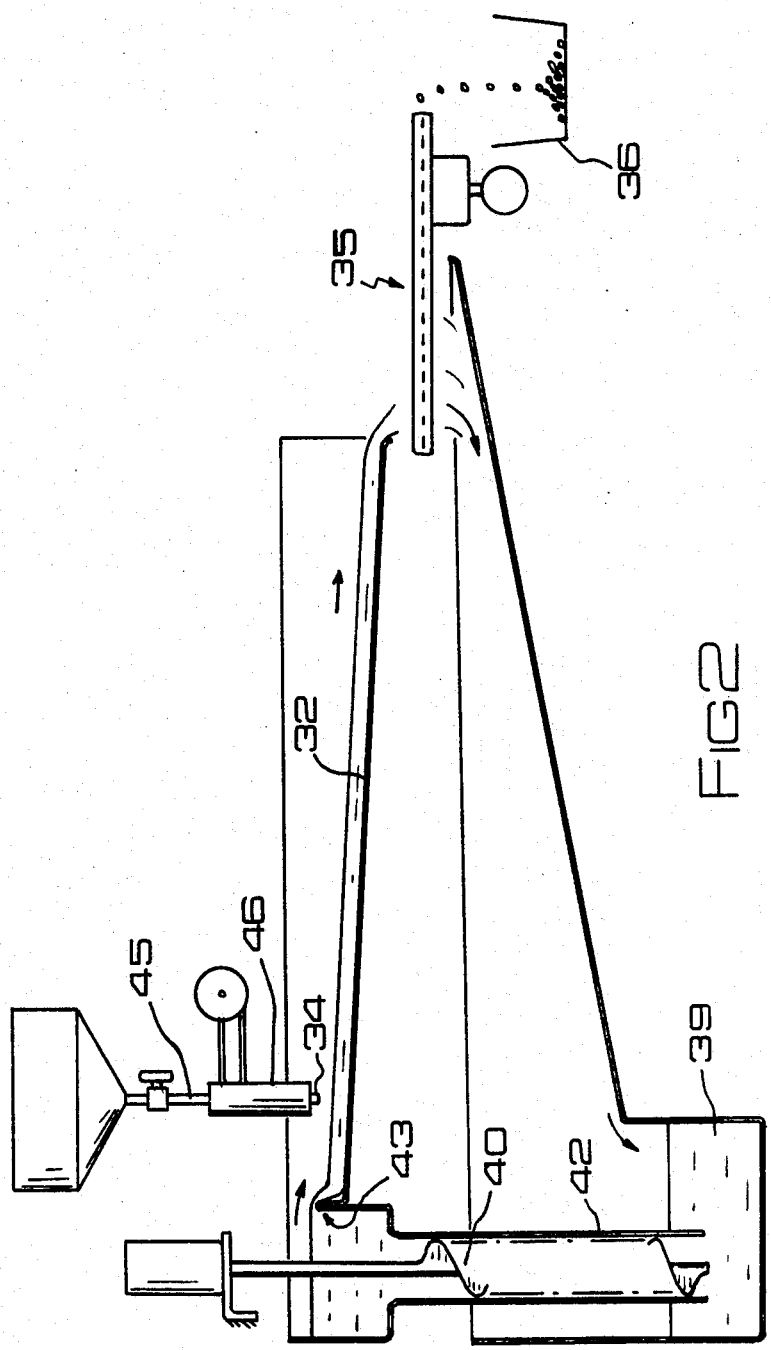

PROCESS FOR FREEZING OR CHILLING

This invention relates to chilling or freezing a substance using liquid which is very much colder than the substance. The process relates particularly to cryogenic liquids, such as liquid nitrogen.

PRIOR ART

It was proposed in Canadian Pat. No. 964,921 (AREF et al, Mar. 25, 1975) to freeze egg by dropping liquid egg into liquid nitrogen. Through a large step forward, the method therein proposed suffered from these drawbacks to its commercial practicability.

1. The droplet would shatter due to its impact on the surface of the liquid nitrogen. This meant that some of the final pieces of frozen egg were large, while others were tiny. If both sizes spend the same time in the nitrogen, there can be a 100 degrees C. temperature difference between them when they emerge from the nitrogen. The very small droplets of egg may be termed "fines".

2. Some of the droplets would drop straight through the nitrogen and be extracted very quickly: others would be caught in eddies, and remain in the nitrogen for a long time. This gave rise, again, to a variation in the final temperature of the droplets emerging from the nitrogen. The problem with the variable temperature of the frozen droplets is this: all the droplets must be thoroughly frozen (i.e. down to a temperature of around −20 degrees C.). To ensure this, the fines and the long-stay droplets might be at around −130 degrees C. or even lower. It wastes nitrogen to cool the droplets below −20 degrees C.

3. The surface of the liquid nitrogen was somewhat turbulent, due to the fact that the nitrogen is boiling, and due to the fact that droplets of liquid egg were being dropped onto the surface. The splashes and spray from the surface of the liquid nitrogen meant that the space just above the surface was very cold. The nozzles from which the egg was dropped therefore had to be a long way above the surface, since otherwise the egg would be frozen within the nozzles.

In Canadian Pat. No. 937,450 (AREF et al, Nov. 27, 1973), it was proposed to drop the liquid egg from a height, as this produced droplets with a popcorn-like shape.

In U.S. Pat. No. 3,832,764 (RASOVICH, Sept. 3, 1974) a moving belt is proposed, which passes below the surface of a cryogenic liquid and out again. The belt carries items to be frozen (though not in the form of discrete droplets). The mechanical problems are very great if components of the apparatus are required to rub against each other, or even to flex, at cryogenic temperatures.

BRIEF DESCRIPTION OF THE INVENTION

The problem with these earlier proposals is that they consumed too much cryogenic liquid for the amount of frozen or chilled finished product, because the cooling process was inefficient. It is recognized in the invention that if the droplets could be made all of the same size, and if the droplets were all to spend the same dwell-time in the cryogenic liquid, then all would will be chilled to the same degree. If that can be made to happen, the efficiency of cooling will theoretically be at a maximum. When the droplets were of different sizes, and the dwell times were variable, the degree of cooling had to be such as to ensure that even the large droplets that passed through quickly chilled. Inevitably in that case, the small droplets that had a long dwell-time were over-cooled.

Another benefit arises if the frozen pellets can be all the same size, which is that the pellets are smooth-flowing, and are easier to store and handle.

In the invention, the substance to be chilled or frozen is dropped from only a very small height onto the surface of the cryogenic liquid. It has been found that if the drop-height is small the droplets do not break up or shatter on impact with the surface, and the problem of over cooled fines is therefore largely eliminated. Also, the manner of entry into the cryogenic liquid is more controlled if the drop-height is small, and the dwell-time can therefore be more constant. It has been found that these advantages occur when the drop-height is 12 cm. or less.

There are difficulties however associated with dropping the pellets from a low height. The cryogenic liquid tends to boil violently at the point where the relatively warm substance enters. Even as the substance chills, the cryogenic liquid still continues to boil, though with gradually decreasing vigour. Hence the surface of the cryogenic liquid just above the droplet is very turbulent, with violent eruptions of bubbles and general splashing. The substance to be chilled is dispensed through a nozzle: if that nozzle is close to a splashing, erupting surface, then the nozzle itself can easily freeze up. Also, the droplets of the substance may be buffeted in the turbulence, which leads to a variation in size which has the problems described above.

It is recognized in the invention that the step of dropping the substance from a small height should be supplemented by the step of causing the cryogenic liquid to move away at a velocity relative to the point at which the substance enters the cryogenic liquid. This velocity should be large enough that the violence caused by the droplets upon entering the cryogenic liquid is quickly carried away from the region of the nozzle. Now, the surface of the cryogenic liquid near the nozzle is smooth and placid. A typical value of the velocity would be around 0.5 m/s.

Whilst it would be possible to arrange for the cryogenic liquid to be stationary and for the nozzle to have the velocity, preferably the nozzle stays stationary and it is the cryogenic liquid that has the velocity. The velocity may either be linear or rotary, and respective embodiments of both are described below.

Another aspect of the boiling nitrogen arises as follows. The substance to be chilled enters the nitrogen or other cryogenic liquid and solidifies into pellets. Each pellet is surrounded by a bubble of gaseous nitrogen as the nitrogen boils in the immediate vicinity of the pellet. The density of the substance to be chilled of course depends on what the substance is, but the kind of substances that are appropriate for freezing and chilling turn out to have a density value such that the substance normally sinks in liquid nitrogen, but that pellets of the substance tend to float if surrounded by a bubble of gaseous nitrogen.

The pellets may be arranged either to pass downwards into the cryogenic liquid, or to remain on the surface, during their period of residence, and again respective embodiments of both arrangements are described below.

If the pellets are to move downwards, then it is important either to break up the bubble of gas, or to create a strong downwards current in the cryogenic liquid, as otherwise the pellets will not sink. This can be done, as will be shown, by imparting to the cryogenic liquid a helical swirling motion. An impeller rotates about a vertical axis and causes the liquid to circulate in the following manner: first the liquid rises vertically up the centre of the impeller to the surface, then it flows radially outwards on the surface; and then the liquid flows downwards, radially outside the impeller.

Superimposed on this circulation is a rotational movement about the impeller axis. This composite kind of motion is suitable for use with the invention. The pellets are quickly conveyed away from the nozzle, and the downwards current overcomes the buoyancy that the pellets acquire from the gaseous nitrogen. The motion in fact can be vigorous enough that the bubbles of nitrogen are broken up, so that the pellets become less buoyant, and, depending on the density of the substance, may sink even without the downwards current to aid them.

Centrifugal forces are created by the rotary motion in the liquid. When a bubble starts to move towards the surface from within the liquid nitrogen, these forces urge the bubble inwards towards the axis of the rotating body of liquid. Thus the tendency is that the bubbles of gas, as they rise, move towards the axis of the impeller, and erupt at the surface near to the axis of the impeller, leaving the rest of the surface smooth and placid. The fact that the movement of the nitrogen is controlled means that the dwell-time of the pellets can be substantially constant.

Hence, the rotation and vertical circulation caused by an impeller is an advantageous way of providing the velocity called for in the invention.

The velocity of the cryogenic liquid relative to the nozzles may, on the other hand, be a linear motion of the liquid. Thus, the cryogenic liquid may be channeled into a trough, and may be moved along the trough beneath the nozzle. The pellets that form in the cryogenic liquid are carried along with the flow.

With this arrangement, the residence time of the pellets in the liquid can be easily and accurately controlled. There is not need to break up the nitrogen bubble, since the pellet may be allowed to float on the liquid surface. The splashing caused by local boiling is downstream of the nozzle. Thus, the velocity of the cryogenic liquid ensures that the droplets of the substance which enter the liquid from a low height are received as gently as possible into the liquid, the result of which is that the pellets have a consistent size; also, the residence time is consistent pellet to pellet. This combination provides a manner of freezing and chilling substances that is very economical and efficient as regards the quantity of cryogenic liquid required.

Preferably, the nozzles should be heated in some manner. When the nozzle is close to the surface, as in the invention, it is in a very cold region, and there is a tendency for the substance to freeze in the nozzle—if not completely then at least to an extent that causes the orifice-size of the nozzle to contract, which reduces the throughput, and could cause irregular-sized pellets.

In the invention, a manner of heating the nozzle is provided which is very simple. When the liquid refrigerant boils just above the surface. A fan may assist this extraction. Instead of the space above the surface being sealed, the space is left open around the nozzles. Hence the extraction fan, in extracting the spent gaseous refrigerant, also draws in some air past the nozzles. This air is at ambient temperature and keeps the nozzles warm enough to prevent their freezing up.

Alternatively, a jacket may be provided around the nozzle, through which hot air circulates. The nozzles could also be heated by means of an electrical element.

IN THE DRAWINGS

FIGS. 1 and 2 illustrate different methods of freezing substances.

DETAILED DESCRIPTION OF PREFERRED EMBODIMENTS

Figure 1:
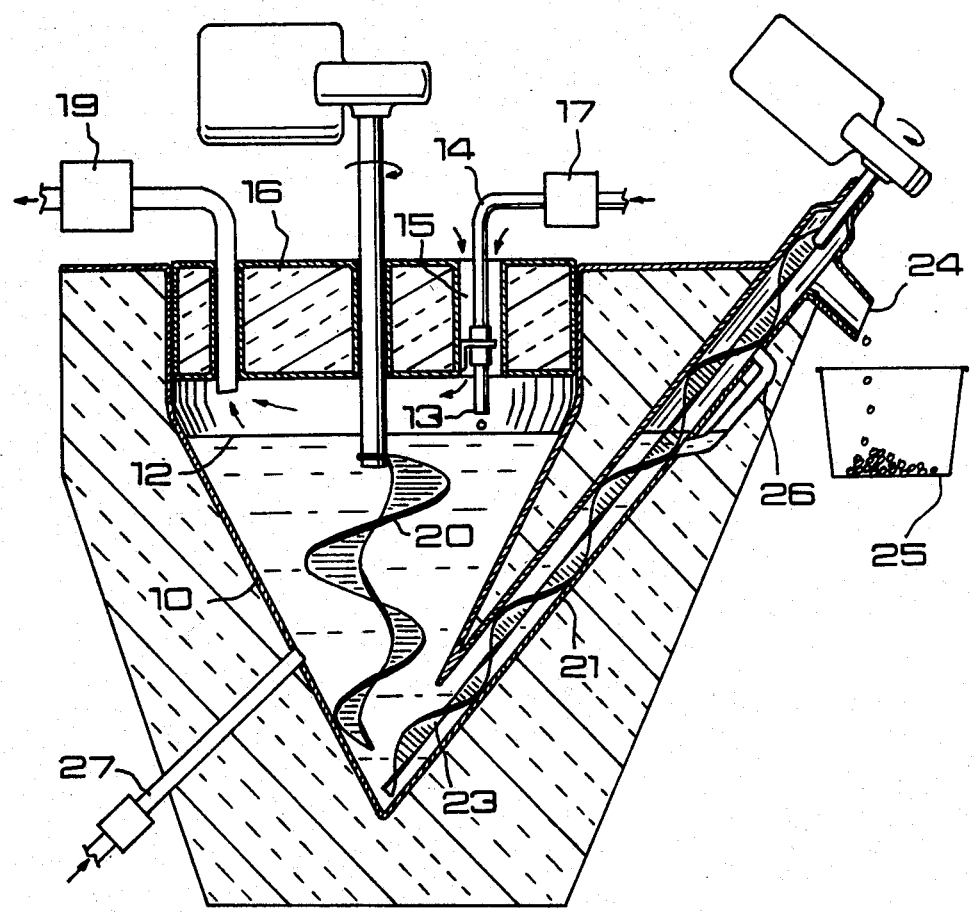

The accompanying FIG. 1 shows diagrammatically an apparatus for putting the invention into practice.

The apparatus includes a stainless steel vat 10 of conical shape. The vat 10 contains liquid nitrogen, the surface of which comes up to the level 12.

About 10 cm above the surface level 12 is a nozzle 13, (which is one of many in a commercial apparatus). The nozzle 13 is connected to a supply tube 14, which is mounted in a hole 15 in a lid 16 of the vat 10.

The tube 14 leads from a tank 17. The tank 17 contains a supply of the substance to be chilled or frozen.

The substance, in liquid form, may fall from the tube 14 in a continuous stream, or may drip from the tube 14, or may be broken up prior to leaving the tube into discrete droplets. The continuous stream is the more convenient, and in fact the substance breaks up into droplets as soon as it contacts the nitrogen.

An extraction fan 19 is provided, to carry gaseous nitrogen away. In some circumstances, the gaseous nitrogen can be fed to a heat exchanger for use in other refrigeration processes, since it is still very cold. The fan 19 is effective also to draw air in through the hole 15 in the lid 16. The incoming air is warm enough to keep the nozzle 13 from freezing up. This warm air does not tend to heat up the nitrogen in any significant manner since it is small in relation to the whole heat load and is quickly extracted.

Mounted in the lid 16 is a motor driven impeller 20, with its axis disposed vertically. The impeller is so arranged, in conjunction with the concial vat 10, that when the impeller 20 rotates, the liquid nitrogen swirls circumferentially around the vat 10, at the same time undergoing an upwards motion through the impeller. The nitrogen then flows outwards at the surface, and circulates back downwards, down the walls of the vat 10. Droplets of the substance move radially outwards and sink below the surface 12, where they are picked up by the current and forced downwards to the bottom of the vat 10.

A conduit 21 opens into the bottom of the vat 10 and a motor driven auger 23 is mounted for rotation in the conduit 21. Frozen droplets or pellets fall into the augur 23 and are conveyed up the conduit 21 and out through the chute 24. The pellets are now ready to be stored in a freezer—or to move on to another process stage—and may be collected by a conveyor 25.

Liquid nitrogen falls back into the conduit 21 from the augur 23 as the blade of the augur 23 emerges above the level 12 of the refrigerant. A collector tube 26 is provided to ensure that the nitrogen can drain back freely. If any liquid nitrogen were to be discharged through the chute 24, that would be wasteful.

The vat 10 also includes a suppy 27 of liquid nitrogen. The level 12 may be controlled by a float valve, or other suitable means.

The augur 23 is inclined at quite a substantial angle to the vertical. It should be as upright as possible, however, within the restrictions permitted by the vat 10. It could be arranged in a modification (not shown) that the augur 23 in fact was concentric with the impeller 20.

The impeller 20 and the augur 23 may be mutually set up so as to adjust the dwell-time of the droplets in the refrigerant: in combination with the rate at which droplets fall from the nozzles, and the size of those droplets, a very consistent frozen product can be obtained, both as to size and as to temperature. This consistency means that the conditions can be delicately adjusted to give the maximum efficiency in terms of production per unit of nitrogen used.

FIG. 2 shows another apparatus, where the motion of the cryogenic liquid past the low-height nozzle of the invention is provided in a different manner.

The apparatus 30 includes a trough 32, along which flows liquid nitrogen at a depth of 2 or 3 cm. Liquid egg is discharged into the nitrogen in the trough from a nozzle 34 placed about 10 cm above the level of the nitrogen. The nitrogen flows along the trough 32 at a velocity between 0.1 to 0.5 m/s.

The egg solidifies into pellets, and the egg remains in the nitrogen for a dwell time of between 2 and 15 seconds.

At the end of the trough 32 is a screen 35. The screen 35 includes a vibrator that shakes the screen to and fro by means of an electric motor. The arrangement of the screen 35 is such that the frozen pellets are shaken off the screen and into a conveyor 36, whilst the nitrogen washes out and falls through the screen. The nitrogen could be separated from the pellets in other ways, for example by the use of a centrifuge, or even by the use of a simple screen or mesh without a vibrator.

The nitrogen drains down an inclined return tray 37 into a reservoir 39. A means is provided for adding more nitrogen automatically if the level falls too low.

The nitrogen is recirculated back into the trough 32 by means of an impeller 40, which acts in a conduit 42. The clearance between the impeller 40 and the conduit 42 is great enough to ensure no actual contact between the relatively moving parts. Whatever means is used for recirculating the nitrogen should be compatible with the very low temperatures.

Nitrogen from the impeller 40 falls over a weir 43 and thence into the trough 32.

The apparatus 30 is shown diagrammatically: naturally the components of the apparatus are very heavily insulated. The nozzle 34, and the pipe 45 leading to it, have a jacket 46 around them through which warm air is circulated. Gaseous nitrogen is extracted from the apparatus through ducts.

As mentioned, the substance to be frozen or chilled can be liquid egg. Frozen egg is a substance that greatly benefits from the above described consistency.

The terms "chilled" and "frozen" are synonymous for the purposes of the invention: "frozen" is a more appropriate term to use with water-containing substances.

One major criterion whether the invention can be used with a substance is that the substance must be capable of going into discrete droplets. Egg, for example (when mixed into a homogenous liquid) is thick and creamy and admirably suited.

A very thin, runny liquid might not be so suitable as the droplets would be hard to control. But a thick liquid, such as a combination of a viscous liquid with a runny liquid, and such as a thin liquid containing solids in suspension, would be suitable.

The invention can be used even if the temperature of the substance is quite high. Some chemicals, for instance, are in a viscous liquid sate only at elevated temperatures, yet it may be required to chill such substances in small droplets. The hot droplets can be dropped into liquid nitrogen, and again the conditions set for maximum efficiency. Fatty amines are in this category. Sometimes, liquids other than liquid nitrogen will be more suitable. Chilled brine, for example, could be used with the hotter substances.

A substance in puree-form is also suitable, such as de-boned and de-fibred meats, or crushed fruit. Liquid soap, and liquids containing bacteria cultures, are suitable.

What is claimed is:

1. A method for freezing or chilling a substance, characterized by the steps:
   of discharging the substance from a nozzle into a very much colder liquid from such a small height above the surface of the liquid that the substance solidifies gently into pellets that are substantially consistent in size;
   and of imparting such a large relative velocity between the liquid and the nozzle that turbulence on the surface of the liquid due to local boiling is carried away from the nozzle substantially immediately.

2. Method of claim 1, where the said height is not more than 20 cm.

3. Method of claim 2, where the height is between 10 cm and 12 cm.

4. Method of claim 1, where the said relative velocity is between 0.1 and 1.5 meters per second.

5. Method of claim 1, where the relative velocity is imparted by conducting the liquid past a stationary nozzle.

6. Method of claim 5, where the liquid is contained in a vat, and an impeller is provided which imparts a rotary swirling motion to the liquid.

7. Method of claim 6, where the impeller also imparts a vertical re-circulation to the liquid, the liquid flowing upwards through the impeller, then radially outwards at the surface, then returning downwards at a position radially beyond the impeller.

8. Method of claim 6, where the pellets are collected at the bottom of the vat and where an augur is provided which is also positioned at the bottom of the vat that the pellets enter the augur end and are thereby conveyed out of the vat.

9. Method of claim 8, where the augur is at a substantial angle to the vertical.

10. Method of claim 8, where the impeller and the augur are mounted and driven in such a way that, below the surface of the liquid, the impeller and the augur are not in rubbing contact with anything.

11. Method of claim 5, where the vat is conical.

12. Method of claim 5, where the liquid is contained in a trough, and means is provided for conveying the liquid along the trough.

13. Method of claim 12, where the liquid in the trough has a depth of 1 to 5 cm.

14. Method of claim 12, where the substance is discharged into the liquid in the trough, where the solidifying pellets of the substance are carried along with the cryogenic liquid, and where a screen is provided through which the liquid passes, the screen being of such a pitch that substantially all the pellets remain on the screen and substantially all the liquid passes through.

15. Method of claim 14, where a means for vibrating the screen is provided, and where there is no rubbing contact in the liquid between a component or part of the screen, or of the means for vibrating the screen with anything.

16. Method of claim 14, where a means is provided for recovering the liquid that passes through the screen, and of recirculating that liquid back into the trough.

17. Method of claim 16, where the means for recirculating the liquid includes a rotary impeller mounted vertically in a tubular conduit, and where the impeller is not in rubbing contact with anything below the surface of the liquid.

18. Method of claim 1, including the step of supplying enough heat to the nozzle that the substance does not freeze up, solidify, or coagulate in the nozzle.

19. Method of claim 18, comprising the steps of extracting, from the region adjacent to the nozzle, the spent cryogenic liquid that has become gaseous, and of providing an air passage means near the nozzle through which ambient air is drawn past the nozzle and thereby heats the nozzle.

20. Method of claim 18, where the nozzle is provided with a jacket, and warm air is circulated through the jacket.

21. Method of claim 1, where the substance is discharged from the nozzle in a continuous stream.

22. Method of claim 1, where the substance, as it passes through the nozzle, has the consistency of liquid egg.

23. Method of claim 22, where the substance is egg.

24. Method of claim 1, where the substance is thick and creamy.

25. Method of claim 1, where the substance has a puree-like consistency.

26. Method of claim 1, where the substance is a liquid containing suspended solids.

27. Method of claim 1, where the substance is a mixture of viscous and runny liquids.

28. Method of claim 1, where the substance is a fatty amine.

29. Method of claim 1, where the substance is liquid soap.

30. Method of claim 1, where the substance includes a bacteria culture.

31. Method of claim 1, where the liquid is a cryogenic liquid.

32. Method of claim 1, where the liquid is liquid nitrogen.

* * * * *